Patented Jan. 2, 1951

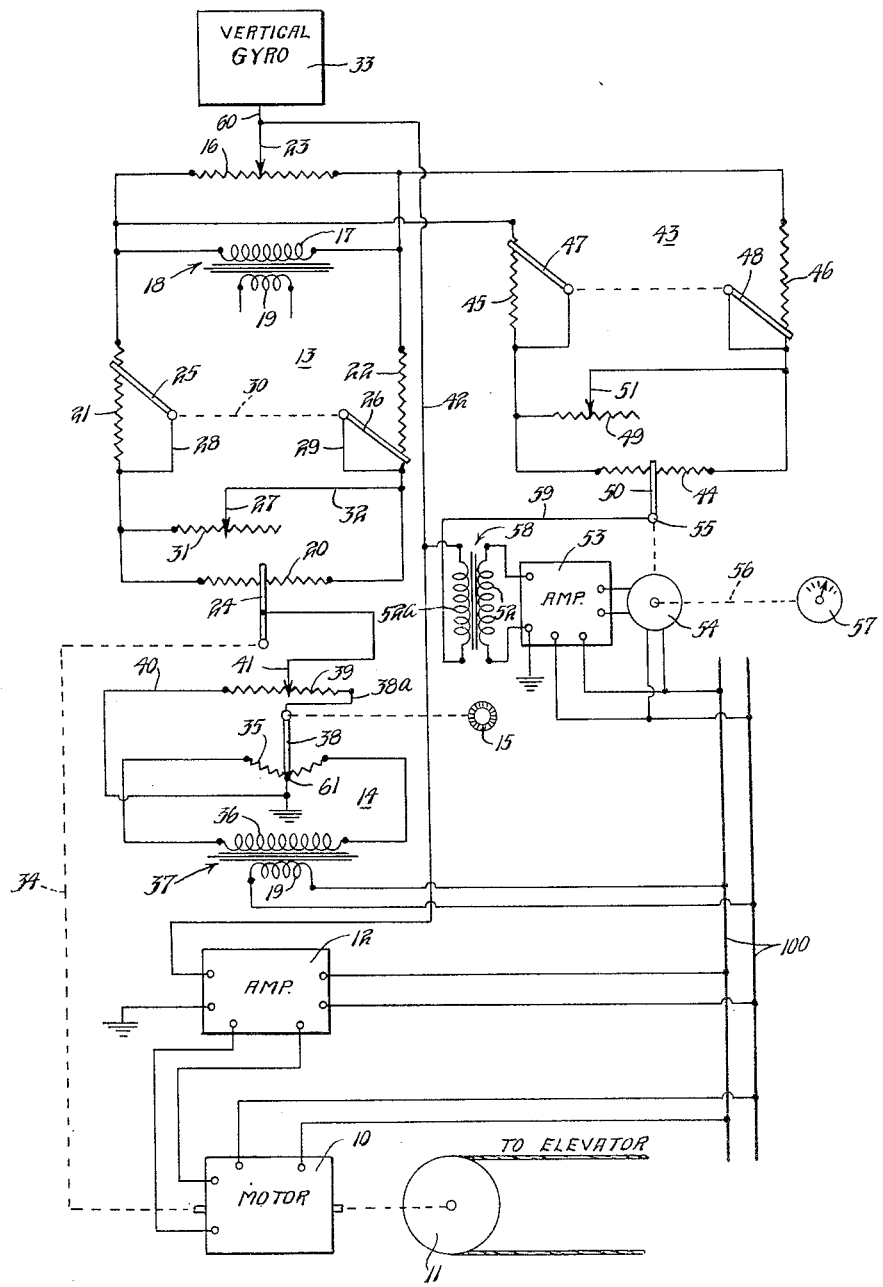

2,536,850

UNITED STATES PATENT OFFICE 2,536,850

AIRCRAFT CONTROL AND INDICATING APPARATUS

Robert J. Kutzler, Minneapolis, Minn., assignor to Minneapolis-Honeywell Regulator Company, Minneapolis, Minn., a corporation of Delaware Application May 1, 1946, Serial No. 666,495

6 Claims. (Cl. 318—29)

1

The present invention is concerned with aircraft control and indicating apparatus.

An object of this invention is to provide an improved aircraft attitude indicator associated with a flight control system.

A further object of this invention is to provide a flight control system and aircraft attitude indicator in which the system and the indicator are both jointly controlled through electrical means by the same gyro.

A further object of this invention is to provide a flight control system for an aircraft including one impedance network for controlling said aircraft, indicating means including a second impedance network, and connections between the gyro of the aircraft and the two impedance networks for jointly controlling the same.

A further object of this invention is to provide a flight control system and attitude indicator for an aircraft including one impedance network for controlling said aircraft, a second impedance network, indicating means isolated from said second impedance network but controlled thereby, and connections between the gyro of the aircraft and the two impedance networks for jointly controlling the same.

A further object of this invention is to provide a flight control system and attitude indicator for an aircraft including one impedance network for controlling said aircraft, a second impedance network including a portion of said first network for controlling an indicator and a connection between said gyro and said portion for jointly controlling said networks.

Further objects and advantages of the present invention will be apparent from a consideration of the accompanying specification, claims and drawing, of which The single figure is a schematic view of the flight control system and aircraft attitude indicator.

An aircraft in flight may have movements about any of three axes. These axes are designated the turn axis, the roll axis, and the pitch axis. The aircraft is controlled about the turn axis by a rudder; about the roll axis by the ailerons; and about the pitch axis by the elevators. Such a general control system for an aircraft is well known in the art. This application is concerned with that portion of a flight control system for an aircraft which controls the movement of the aircraft about its pitch axis. The movement of an aircraft about its pitch axis is controlled by elevators which may be operated manually or by power means. The apparatus of

2 this invention uses power means for operating the elevators. To this end there is shown in the figure a motor means 10 for operating a cable drum 11 which is connected by cables to the elevator. The cables are indicated by the dotted lines extending from the drum. The motor 10 may be of any conventional type capable of being reversibly controlled by the output of an amplifier. The motor 10 is connected to an amplifier 12.

The amplifier 12 is of any suitable type which is capable of supplying to an output circuit a voltage, the phase relationship of which to a standard source or line voltage is dependent upon and reversible with the signal voltage supplied to the amplifier. The amplifier 12 is controlled by a signal input. This signal input is derived from two impedance networks 13 and 14 which are connected in series through a circuit that extends from wiper 23, conductor 42, amplifier grid, cathode of amplifier to ground, grounded side of network 14, wiper 38, wiper 24, impedance network 13 to wiper 23.

The impedance network 13 as shown in the drawing is arranged in the form of a Wheatstone bridge. In this arrangement a resistor 16 constitutes two legs of the bridge. The ends of the resistor 16 are connected to a secondary 17 of a transformer 18 whose primary winding is indicated at 19. Since the transformers which are connected to a supply line 190 may be energized by a common primary 19, this reference character has been used in each case to indicate the primary winding. The two other legs of the bridge are formed by a resistor 20. One end of the resistor 20 is connected through a resistor 21 to one end of the secondary 17. The other end of the resistor 20 is connected through a resistor 22 to the other end of the secondary 17. A wiper 23 is movable over resistor 16 and a wiper 24 is movable over the surface of resistor 20. A signal may be obtained from this bridge when there is a relative displacement of wipers 23 and 24 from their electrical centers. Wipers 23 and 24 constitute the operative elements of the bridge. They are the parts of the bridge that may be moved while the plane is actually in flight.

The impedance network 13 includes wipers 25 and 26 which cooperate with resistors 21 and 22, respectively. These wipers are not positioned during flight but are generally adjusted prior to the flight of the aircraft. As has been stated, a signal from the impedance network 13 is derived when there is relative displacement of wipers 23 and 24. Ordinarily, the wipers 23 and 24 are at the electrical center of their respective resistors. It may be desirable at times to change the electrical center of wiper 24. The wiper 25 with its resistor 21 and wiper 26 with its resistor 22 provide means whereby the electrical center of wiper 24 may be adjusted. Wiper 25 is connected by conductor 28 to the lower end of resistor 21 and it may be seen that the wiper 25 and conductor 28 shunt a portion of resistor 21. Likewise, wiper 26 is connected by conductor 29 to the lower end of resistor 22 and serves to shunt a portion of resistor 22. The wipers 25 and 26 are interconnected by a mechanism 30 in such a manner that if wiper 25 is moved to increase the resistance of resistor 21 the wiper 26 is simultaneously moved to decrease the resistance of resistor 22. If wiper 25 is moved to decrease the resistance of resistor 21 the potential of wiper 24 would be changed from its normal value. This would result in a difference of potential existing between wipers 23 and 24. To remove such difference of potential it is necessary to move wiper 24 to the right until no difference of potential between wipers 23 and 24 exists. By this means the electrical center of resistor 20 has been moved to the right. Conversely, if the resistance of resistor 22 be decreased by movement of wiper 26, the electrical center of resistor 20 is moved to the left. The purpose of the wipers 25 and 26 and their respective resistors is to permit the elevator to be centered in neutral position. The resistors 21 and 22 and their respective wipers 25 and 26 are therefore often referred to as centering means since they serve to center the elevator.

By providing a resistor having an adjustable wiper between each end of resistor 20 and secondary 17 of the transformer, it is possible to obtain a more rapid adjustment than if only a single resistor were included since a slight movement of connection 30 would have twice the effect on changing the electrical center of wiper 24. Moreover, resistor 20 does not change sensitivity, under this adjustment as is explained later.

The resistor 20 of impedance network 13 is shunted by an additional resistor 31. A wiper 27 which bears on the surface of resistor 31 is connected to a lead 32 which is connected to the bridge between one end of resistor 20 and the secondary 17 of the transformer. The wiper 27 may be manually positioned to change the effective amount of resistor 31 that is in parallel with resistor 20. The function of the resistor 31 and its wiper is to vary the ratio between the movements of wipers 23 and 24. Resistors 31 and 20 are connected in parallel. The voltage drop across resistor 20 is the same as the voltage drop across that portion of resistor 31 that is in the circuit. The resistance of resistor 20 is constant. The current through resistor 20, however, depends on the position of wiper 27. If wiper 27 is moved so that there is very little of resistor 31 in the circuit very little current will pass through resistor 20. The voltage drop across any portion of resistor 20 therefore decreases with a decrease of current through resistor 20. On the other hand, the voltage drop across a portion of resistor 16 does not change as wiper 27 is moved. If wiper 23 is moved to derive a signal between wipers 23 and 24, the amount of movement given to wiper 24 to position it so that no signal is derived varies inversely as the current through resistor 20. If wiper 23 is moved over its resistor 16 to derive a signal, the follow up wiper 24 is moved to rebalance the voltage between wipers 23 and 24. If the greater part of resistor 31 is shunted across resistor 20 a greater current will flow through resistor 20. Consequently, wiper 24 to set up a rebalancing voltage would not have to move as great a distance as it would if only a slight portion of resistor 31 were shunted across resistor 20. The wiper 27 is manually adjusted for any desired relative movement between wipers 23 and 24. It may be said to adjust the sensitivity of the wiper 24 with respect to wiper 23. It should be noted that this sensitivity is constant after once adjusted even though the center position of wiper 24 may be varied. The sensitivity is not disturbed by the adjustment of the centering means since by providing the two resistors 21 and 22 the voltage drop across resistor 20 is not altered. This follows from the fact that if wiper 25 is moved to decrease the amount of resistor 21 in circuit the wiper 26 is concomitantly moved to increase the amount of resistor 22 in circuit.

The impedance network 13 provides the automatic control for the aircraft. For this purpose, its wiper 23 is connected to a vertical gyro 33 through a mechanical connection 60. The gyro 33 is of the conventional type having a rotor, so mounted that its axis of rotation is vertical. The rotor is mounted for movement about three perpendicular axes. The gyro is so mounted upon the aircraft that upon movement of the aircraft about its pitch axis it transmits a movement to the wiper 23 to displace this wiper from its electrical center. The signal resulting from the displacement of wiper 23 with respect to wiper 24, by means subsequently described, causes the operation of the motor 10 to drive the elevator cable drum. The motor 10 through a mechanical linkage 34 drives the wiper 24 to rebalance the impedance network 13. At rebalance no signal is obtained from the impedance network 13 and the motor 10 stops rotation.

The impedance network 14 consists of a resistor 35 connected across the ends of a secondary 36 of a transformer 37. The primary winding of transformer 37 is indicated at 19. Resistor 35 has a center tap 61 which is connected to ground. A wiper 38 bears on resistor 35. The wiper 38 is connected to a manual control means 15 whereby it may be variously positioned to select positive or negative voltages with respect to the center tap connection of resistor 35. Wiper 38 is connected through lead 38a to one end of a resistor 39. The opposite end of resistor 39 is connected by lead 40 to the center tap of resistor 35. A wiper 41 is positioned for adjustment over the surface of resistor 39. The wiper 41 and resistor 39 form a potentiometer arrangement for any voltage selected between wiper 38 and the center tap of resistor 35. The wiper 41 is connected to wiper 24 of impedance network 13. It may be seen that wiper 41 may select any portion of the voltage existing between wiper 38 and the center tap of resistor 35. If wiper 41 is at the right end of resistor 39, all of the potential between wiper 38 and the center tap of resistor 35 will be applied to wiper 41 and to wiper 24. On the other hand, if wiper 41 is at the left end of resistor 39 none of the potential existing between wiper 38 and the center tap of resistor 35 will be applied to wiper 24.

One side of amplifier 12 is connected from its ground to the grounded center tap 61 of resistor 35. The wiper 23 is connected by means of lead 42 to the other side or grid of amplifier 12. It is thus evident that a signal voltage may be applied to amplifier 12 either by the displacement of wiper 38 through its manual means 15 or by the displacement of wiper 23 through its connection with the vertical gyro. The amplifier 12 will function upon application of a signal voltage to cause the motor 10 to operate the elevator. At the same time, the motor 10 through its connection 34 drives the wiper 24. The movement of wiper 24 sets up an equal but an opposing voltage to that which initiated the operation of the amplifier. The impedance networks thereupon become balanced with respect to the amplifier and the motor ceases to operate.

A third impedance network 43 is used to control the positioning of an attitude indicator. It should be noted that this impedance network 43 is in the form of a Wheatstone bridge in which the same resistor 16 of impedance network 13 forms two legs of the bridge. The other two legs of the bridge are constituted by a resistor 44. One end of this resistor 44 is connected through a resistor 45 to one end of secondary 17 of transformer 18. The other end of resistor 44 is connected through a resistor 46 to the other end of secondary 17. The two impedance networks 13 and 43 utilize the same secondary 17 as well as resistor 16. Resistors 45 and 46 and their respective wipers 47 and 48 constitute centering means for the wiper 50, the wiper 50 being positioned to engage the surface of resistor 44. The centering means above mentioned for impedance network 43 are similar to the previously described centering means for impedance network 13 and will therefore not be described in detail.

A ratio adjusting device comprising resistor 49 and wiper 51 is provided for impedance network 43. This ratio adjusting device is similar to the previously described ratio adjusting means comprising resistor 31 and wiper 27 for impedance network 13 and therefore need not be described in detail.

The wipers 23 and 50 of impedance network 43 comprise the means for obtaining a signal from this impedance network. Any relative displacement of these two wipers will result in a difference of potential between them. The resistor 16 forms a common part of both impedance networks 13 and 43 and since the vertical gyro may position wiper 23 of resistor 16 it may be said to jointly control both impedance networks. Wiper 23 is connected through lead 42 to one end of a primary 52a of a transformer 58. Wiper 50 is connected through a lead 59 to the other end of primary 52a. A secondary 52 of transformer 58 is connected to amplifier 53. The amplifier 53 is similar to amplifier 12. The amplifier 53 controls a motor 54. The motor 54 may be similar to motor 10. The motor 54, amplifier 53, amplifier 12, and motor 10 are all connected to a common source of line voltage. The motor 54 through an arrangement 55 is mechanically connected to wiper 50. Motor 54 is also connected by means 56 to an indicator 57. The indicator is graduated to conveniently indicate the attitude of the aircraft.

It may be observed that the amplifier 12 for controlling the elevator is directly coupled to the output of the series connected impedance networks 13 and 14. In one case the connection consists of a lead 42 running from wiper 23 directly to the amplifier and the other connection is from the grounded side of the amplifier to the grounded side of the center tap of resistor 35. On the other hand, the amplifier 53 is connected through transformer coils to the output of impedance network 43. The transformer coupling of amplifier 53 has two advantages. This type of coupling permits the sensitivity of the indicator 57 to be modified from what it would have through direct coupling of the amplifier with the impedance network 43. The more important purpose of this transformer coupling is to isolate the signal derived from network 43 from the signal derived from the combination of networks 14 and 13. The indicator 57 is to be controlled by the signal resulting from the movement of wiper 23 due to the action of the gyro vertical 33 and should not be affected by the operation of the manual control 15 or wiper 24. For example if impedance network 43 were directly coupled to amplifier 53 by connecting lead 42 to the grid of amplifier 53 and connecting wiper 55 to ground and manual means 15 were moved, the signal resulting from such movement and appearing between wiper 23 and the ground of resistor 35 to control amplifier 12 would also appear between wiper 23 and the ground of amplifier 53. Amplifier 53 would cause motor 54 to position indicator 57 when the aircraft had not as yet changed its attitude. Such result would give a false indication of the aircrafts attitude.

*Automatic operation*

If the plane, due to atmospheric conditions, moves about its pitch axis, the vertical gyro 33 through connection 60 will cause the movement of wiper 23. The direction in which wiper 23 is displaced by the vertical gyro is dependent upon whether the aircraft is nosing up or nosing down. When the position of wiper 23 is changed, a voltage signal arising out of the relative positions of wipers 23 and 24 may be said to be generated and may be applied to amplifier 12 through the following connections: wiper 23 connects to one side of amplifier 12 through lead 42; the other side of the source of signal voltage leads to amplifier 12 from wiper 24 through wiper 41, that portion of resistor 39 in the circuit, lead 38a, wiper 38, to the center tap of resistor 35 to ground and to the amplifier ground. The amplifier now controls the motor 10 to position the elevator. Motor 10 also drives wiper 24 through its connection 34 to rebalance the impedance network 13. At the time of the balance, there is no signal derived between wipers 23 and 24 and the amplifier 12 no longer operates to control the motor 10.

At the same time the displacement of wiper 23 sets up a signal between wiper 23 and wiper 50 of impedance network 43. This signal is applied to amplifier 53 which causes motor 54 to drive wiper 50 to rebalance network 43. Motor 54 also drives indicator 57 to show the attitude of the aircraft or its departure from normal flight position.

As the elevator as now positioned causes the plane to assume level flight, the vertical gyro moves the wiper 23 in the opposite direction from that in which it was originally moved. An opposite voltage signal is thereby set up between wipers 23 and 24. This voltage is applied to amplifier 12 which causes the motor 10 to drive the elevator in the opposite direction or toward a neutral position. The motor 10 also moves the wiper 24 in a direction opposite to that which it originally applied to the wiper 24. The impedance network 13 is thereby again placed in balanced condition.

The movement of wiper 23 resulting from the movement of the plane to level flight condition sets up an opposite voltage signal between wipers 23 and 50 from that originally set up. This voltage signal energizes the amplifier 53 which causes the motor 54 to drive the wiper 50 to its electrical center. At the same time, the motor 54 drives the attitude indicator 57 toward normal position.

*Manual operation*

The aircraft may also be positioned about its pitch axis by use of the manual control means 15. If manual control means 15 is operated to displace wiper 38 with respect to the center tap of resistor 35, a voltage is applied to resistor 39. Wiper 41 is positioned to select any desired portion of this voltage. If the impedance network 13 is in a balanced condition, the voltage selected by wiper 41 is applied unmodified through network 13 to amplifier 12. The signal as thus applied to amplifier 12 causes it to effect the operation of motor 10 to position the elevator. This signal however has no effect on network 43 and the indicator 57 does not move. The servomotor 10 through its connection 34 displaces wiper 24 of resistor 20. The wiper 24 is positioned until the voltage between wipers 23 and 24 is equal and opposite to that selected by wiper 38. When such a condition is reached the amplifier 12 is no longer energized and the motor 10 stops.

The elevator as positioned by motor 10 now causes the aircraft to move about its pitch axis. Movement of the plane about its pitch axis causes the vertical gyro to displace its wiper 23. This sets up a signal between wiper 23 and 24 which is applied to the amplifier 12. The amplifier causes the motor 10 to drive the elevator toward neutral position. At the same time it drives the wiper 24 toward neutral position or toward its electrical center. The tilting of the airplane about its pitch axis and the movement of the elevator back towards neutral position continue until the aircraft is in such an attitude that the voltage between sliders 23 and 24 with slider 24 in its center position is equal and opposite to the unbalance voltage of network 14 selected by wiper 38. The tilting of the aircraft and the resulting motion of the vertical gyro also unbalances the network 43 to energize amplifier 53. Amplifier 53 controls motor 54 to effect rebalance of network 43 and positions indicator 57 to indicate the aircrafts attitude.

The unbalancing of the series connected network by the manual means 15 does not directly affect the position of indicator 57. Only when operation of the manual means 15 results in tilting of the aircraft with consequent movement of the vertical gyro is the position of indicator 57 changed. The attitude indicator therefore responds only to movements of the vertical gyro.

When it is desired to regain level flight, the manual control is moved toward the center tap of resistor 35. This causes a signal to be applied to amplifier 12 due to the relative displacements of wipers 23 and 24. The motor 10 thereby becomes operative to move the elevator and wiper 24 to a position opposite of that effected by manual control. As the plane regains level flight the vertical gyro tends to move its wiper 23 to normal position. This causes the amplifier 12 to function whereby motor 10 restores the elevator to neutral position and the wiper 24 to balanced position. The action is such that as the airplane regains level flight the wiper 23 under the influence of gyro 33 reaches its electrical center at the same time that the elevator and wiper 24 reach their normal position. Concomitantly, the wiper 50 is moved to its electrical center under the influence of motor 54 which also drives the indicator 57 to normal or zero position.

It can now be seen that we have provided an improved attitude indicator which functions in the flight control system to indicate the attitude of the aircraft at all times. The attitude indicator through its common inclusion of parts of the control circuit for the flight control system becomes jointing responsive with the flight control system to any movement of the vertical gyro.

I claim as my invention:

1. An automatic flight control and attitude indicating apparatus for an aircraft having a control surface, said apparatus comprising: a control means responsive to the movement of the aircraft about an axis, first and second operating means controlled by said control means, follow up means driven by said first operating means to render said control means ineffective with respect to said first operating means without further movement of the aircraft, means for operating said control surface from said first operating means, follow up means driven by said second operating means to render said control means ineffective with respect to the second operating means without further movement of the aircraft, an indicator, and means driven by said second operating means for positioning said indicator, to show the attitude of said craft.

2. Automatic flight control system for an aircraft comprising a control surface, means responsive to the movement of the aircraft about an axis, a first Wheatstone bridge having two adjustable contactors one being controlled by said responsive means and causing the bridge to be unbalanced thereby, a second bridge, said second bridge being responsive to the unbalance of said first bridge, means for operating the second contactor for rebalancing said first bridge and for operating said control surface, an indicator, and means for rebalancing said second bridge and for operating said indicator, and further means for unbalancing said first bridge to alter the normal position of said first contactor with respect to the second contactor.

3. Control and indicating apparatus for an aircraft comprising: control surface power means; an amplifier for operating said power means; a first Wheatstone bridge consisting of two resistors connected to form a circuit with a source of voltage across one diagonal and an adjustable wiper bearing on each resistor said wipers forming the terminals of the other diagonal; attitude responsive means for adjusting one wiper; operable means connecting the power means and a second wiper; bridge output connections from said wipers to said amplifier; a second Wheatstone bridge consisting of a resistor and wiper of said first bridge and a third resistor having a wiper said resistors being connected to form a circuit and having a source of voltage connected across one diagonal and said wipers engaging said resistors and constituting terminals of another diagonal; means including a motor connected to said wipers of said second bridge and controlled thereby; and means driven by said motor to operate an indicator whereby the attitude of the craft may be observed and to drive the wiper for the third resistor.

4. Control and indicating apparatus comprising control surface power means; a control means for said power means including a Wheatstone bridge which constitutes an electrical signal producing and combining means having two adjustable output members; a second power means; a second Wheatstone bridge having two arms and an adjustable member thereof common with said first Wheatstone bridge and having two output members; a second control means for said second power means; a transformer having a secondary winding connected to said second control means and the primary winding connected to the output members of the second bridge; means for adjusting the member common to both bridges; follow up means from said first power means to the second member of the first bridge; follow up means from said second power means to the second member of the second bridge, and an indicator driven by said second power means.

5. Control apparatus for an aircraft having a control surface for changing the attitude of said aircraft about an axis, said apparatus comprising: position maintaining means responsive to the change in attitude of said craft about said axis; a motor means adapted to position said control surface; control means for controlling the direction of operation of said motor means; a first balanceable control circuit for operating said control means on unbalance thereof; a second motor means; a second control means for controlling the direction of operation of said second motor means; a second balanceable circuit having a portion thereof common to the first circuit; means operated by said position maintaining means upon change in attitude of said craft for unbalancing said first circuit and said second circuit to effect operation of both control means and thereby both motor means; means driven by the control surface motor means for rebalancing the first control circuit; indicating means; and means for positioning said indicating means from the second motor means and for rebalancing said second circuit whereby said indicating means indicates the relative positions of said position maintaining means and said craft.

6. Control apparatus for an aircraft having a control surface for changing the attitude of said craft about an axis, said apparatus comprising: attitude means responsive to the movement of the craft about an axis; a first and a second Wheatstone bridge having two arms in common and both bridges being controlled by said responsive means and unbalanced thereby; means controlled by said first Wheatstone bridge for rebalancing said first bridge and for positioning said control surface; indicating means; and means controlled by said second Wheatstone bridge for rebalancing said second bridge and for operating said indicating means, whereby the effect of the operation of said control surface on the attitude of said craft may be observed on said indicating means.

ROBERT J. KUTZLER.

REFERENCES CITED

The following references are of record in the file of this patent:

UNITED STATES PATENTS

| Number | Name | Date |
|---|---|---|
| 877,312 | Evershed | Jan. 21, 1908 |
| 890,458 | Schley | June 9, 1908 |
| 1,150,903 | Swan | Aug. 24, 1915 |
| 1,420,619 | Barton | June 27, 1922 |
| 1,614,192 | Ewald | Jan. 11, 1927 |
| 1,821,273 | Pike | Sept. 1, 1931 |
| 2,245,802 | McGrath | June 17, 1941 |
| 2,300,537 | Davis | Nov. 3, 1942 |
| 2,368,912 | Barnes Jr. | Feb. 6, 1945 |
| 2,384,380 | Isserstedt | Sept. 4, 1945 |
| 2,452,311 | Markusen | Oct. 26, 1948 |